United States Patent [19]

Denneny, Jr. et al.

[11] Patent Number: 4,463,897
[45] Date of Patent: Aug. 7, 1984

[54] COOLING CONTROL SYSTEM APPARATUS AND METHOD

[75] Inventors: James A. Denneny, Jr., Scottsdale; Charles M. Rowland, Phoenix, both of Ariz.

[73] Assignee: The Garrett Corporation, Los Angeles, Calif.

[21] Appl. No.: 359,544

[22] Filed: Mar. 18, 1982

[51] Int. Cl.³ .............................................. G05D 27/00
[52] U.S. Cl. .................................... 236/92 R; 98/1.5; 165/40
[58] Field of Search ................... 165/40, 38; 98/1.5; 236/92 R; 374/183

[56] References Cited

U.S. PATENT DOCUMENTS

| | | |
|---|---|---|
| 2,002,057 | 5/1935 | Gregg . |
| 2,111,855 | 3/1938 | Groh . |
| 2,316,237 | 4/1943 | Grunert et al. . |
| 2,353,201 | 7/1944 | Talbot . |
| 2,412,071 | 12/1946 | Warner et al. . |
| 2,453,416 | 11/1948 | Dom .............................. 236/92 R X |
| 2,498,194 | 2/1950 | Arthur ............................ 236/92 R |
| 2,582,848 | 1/1952 | Price . |
| 2,583,006 | 1/1952 | Niesemann . |
| 2,662,757 | 12/1953 | Mock ............................. 236/92 R X |
| 2,778,573 | 1/1957 | Morgan ........................... 236/92 R X |
| 2,919,711 | 1/1960 | Lort et al. . |
| 2,992,530 | 7/1961 | Chadwick ....................... 236/92 R X |
| 3,252,324 | 5/1966 | Steele ............................ 236/92 R |
| 3,371,298 | 2/1968 | Narbut ........................... 236/92 R X |
| 3,537,510 | 11/1970 | Rannenberg et al. ........... 236/92 R X |
| 3,706,270 | 12/1972 | Furlong . |
| 3,709,242 | 1/1973 | Chase . |

*Primary Examiner*—William E. Tapolcai
*Attorney, Agent, or Firm*—Terry L. Miller; Albert J. Miller

[57] ABSTRACT

A cooling control system including a valve device controlling a flow of cooling medium to an enclosure in response to a control signal; and a control apparatus generating the control signal as a function of both the temperature and the pressure within the enclosure.

10 Claims, 2 Drawing Figures

COOLING CONTROL SYSTEM APPARATUS AND METHOD

BACKGROUND OF THE INVENTION

The field of this invention is cooling control systems particularly for compartments of aircraft which contain heat-generating electronic equipment.

Because the electronic equipment of an aircraft generates heat during use, cooling must be provided to prevent temperatures from developing which would damage the equipment. In order to cool such electronic equipment many aircraft include a system of ducts conducting cooling air from an air pressure source through the compartment of the aircraft which houses the equipment and then to the atmosphere. The air pressure source is frequently a compressor of a turbine propulsion engine of the aircraft. However, because bleeding pressurized air from the compressor of a turbine engine decreases the power output of the engine and increases its fuel consumption, a means of matching the rate of air flow to the cooling requirements of the equipment is needed to preserve engine performance while insuring adequate equipment cooling. Further, because the ability of the cooling air to carry away heat from the equipment decreases with decreasing ambient pressure and air density as the altitude of an aircraft increases, the rate of cooling air flow must be adjusted to compensate for this decreased heat carrying capacity.

Heretofore, conventional cooling control systems have included a pneumatically actuated flow-control valve controlling the flow of cooling air to the electronics compartment and a control apparatus generating a pneumatic signal for the flow-control valve. These conventional control apparatus characteristically include a temperature-responsive valve generating the pneumatic control signal for aircraft altitudes between sea level and a predetermined altitude. The temperature sensing part of the valve is exposed to the interior of the electronics compartment. Thus, for aircraft altitudes between sea level and the predetermined altitude the temperature of the electronics compartment controls the flow-control valve and the cooling air flow. A pressure-responsive valve is also included in conventional control apparatus and is exposed to ambient air pressure to generate the pneumatic control signal for altitudes above the predetermined altitude. In order to switch control authority between the temperature-responsive valve and the pressure-responsive valve, conventional control apparatus also includes another pressure-responsive bistable valve which switches control between the first two valves at the predetermined aircraft altitude. Thus, above the predetermined aircraft altitude, the cooling air flow rate is controlled exclusively in response to aircraft altitude and not in response to the critical factor of temperature in the electronics compartment.

With such a conventional cooling control system an excess rate of cooling air flow must be provided at some aircraft altitudes which are above the predetermined altitude in order to insure against damaging over-temperature conditions of the equipment. Such an excess cooling air flow detrimentally affects the fuel consumption of the aircraft.

The most pertinent conventional control valves known to the applicant are illustrated in U.S. Pat. Nos. 2,002,057; 2,111,855; 2,353,201; 2,583,006; 2,919,711; 3,706,270; and 3,709,242.

SUMMARY OF THE INVENTION

The present invention provides a cooling control system including a conventional pneumatically actuated flow-control valve and a novel regulating valve generating a pneumatic control signal for the flow-control valve. The regulating valve includes a sensor portion which is responsive to both the temperature and the ambient pressure of an electronics compartment. The regulating valve simultaneously senses and responds to the temperature of the electronics compartment and to the ambient pressure to modulate the flow-control valve and the cooling air flow rate. Thus, the regulating valve controls the cooling air flow as a function of both temperature and pressure. In this way, the temperature of the electronics compartment is controlled to compensate for the decreasing heat-carrying capacity of the cooling air flow as aircraft altitude increases.

According to a specifically disclosed preferred embodiment of the invention, the regulating valve includes a sensing portion defining an expansible chamber. The expansible chamber is filled with a predetermined quantity of a two-phase vapor-liquid medium such as a flourinated hydrocarbon. Because such a two-phase medium is elastic, the expansible chamber expands and contracts in response to changes in ambient pressure. Further, the vapor pressure of such a two-phase medium changes with changes in temperature so that the expansible chamber also changes size in response to temperature changes. The sensing portion of the regulating valve is exposed to the temperature and ambient pressure of the electronics compartment. A valve element of the regulating valve is coupled with the expansible chamber to control a flow of pressurized control fluid from a source thereof to a conventional flow-control valve.

DETAILED DESCRIPTION OF THE PREFERRED EMBODIMENT

Figure 1:
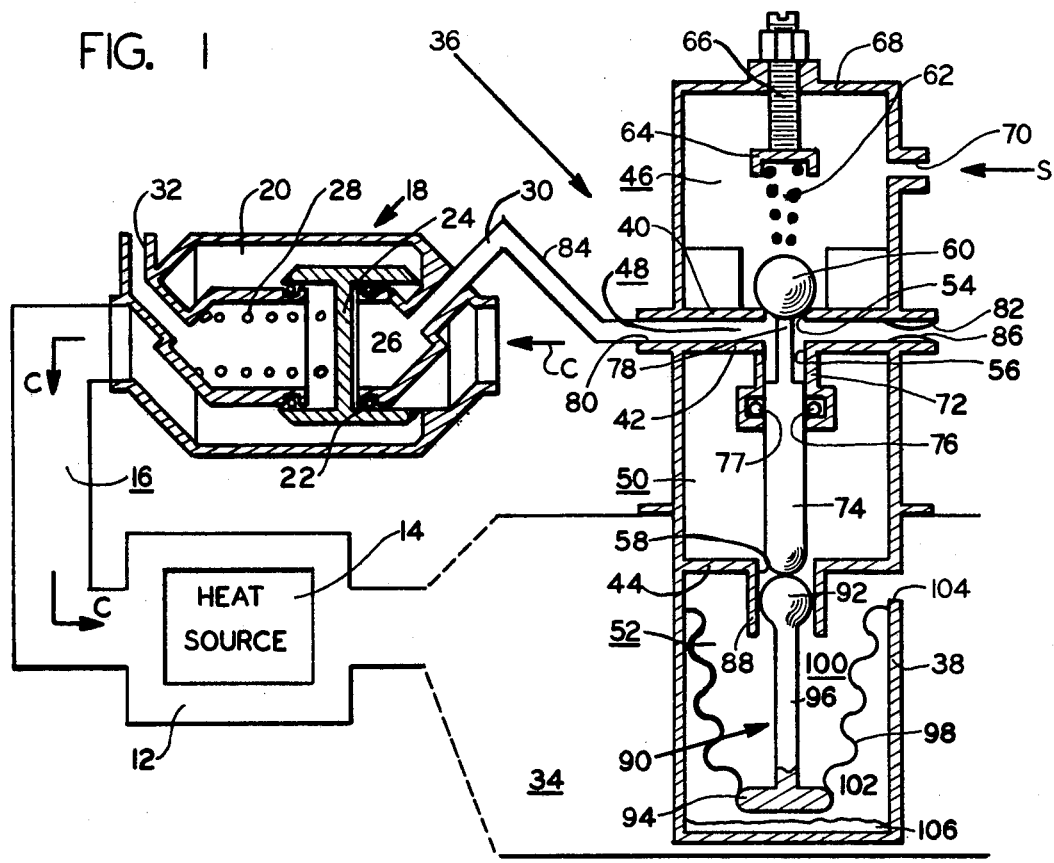
FIG. 1 schematically depicts a cooling control system according to the invention.

FIG. 1 illustrates a cooling control system 10 for an electronics compartment 12 of an aircraft (not shown). The compartment 12 houses heat-generating electronics equipment 14 which is designated in FIG. 1 as a heat source. An inlet duct 16 leads to the compartment 12 and opens to the interior thereof. The duct 16 communicates with a source of pressurized cooling air (not shown) to conduct a flow of the cooling air to the compartment 16 (as is represented by arrows C).

A flow-control valve 18 of conventional construction is disposed in the duct 16 to control the flow of cooling air therethrough. The valve 18 includes a housing 20 movably supporting a sleeve-like valve element 22. The valve element 22 includes a central wall 24 and cooperates with the housing 20 to define a variable-volume chamber 26. A coil compression spring 28 extends between the housing 20 and wall 24 to yieldably bias the element 22 rightwardly, viewing FIG. 1, to a normally closed position. The housing 20 defines an inlet 30 leading to chamber 26 and a vent passage 32 opening outwardly from the area of spring 28. In view of the above, it is apparent that the valve 18 normally closes cooling fluid flow through duct 16 and opens in response to a control fluid pressure applied at inlet 30 to allow a flow of cooling air at a rate which is substantially proportionate to the control fluid pressure.

A vent duct 34 leads from the compartment 12 and opens to the atmosphere. A regulating valve 36 is mounted on the duct 34. The regulating valve 36 includes a hollow housing 38, the lower end of which extends into the vent duct 34.

Upon examination of the regulating valve 36, it will be seen that the housing 38 includes three transverse walls 40, 42, and 44 which cooperate to divide the interior of housing 38 into four chambers 46, 48, 50 and 52. Each of the three walls 40–44 defines one of three coaxially aligning apertures 54–58, respectively. A spherical valve element 60 is disposed in the chamber 46 and is sealingly engageable with the wall 40 at aperture 54. A coil compression spring 62 extends between the valve element 60 and a spring seat 64 to bias the valve element 60 toward engagement with the wall 40. The spring seat 64 is carried by a stem 66 which threadably engages an end wall 68 of the housing 38. Consequently, the preload of spring 62 is variable by rotation of stem 66. The housing 38 defines an inlet 70 communicating with a source of pressurized control fluid which is represented by arrow S.

The wall 42 includes an elongate annular guide portion 72 circumscribing and in part defining the aperture 56. An elongate push rod 74 is movably received in the aperture 56. The guide portion 72 defines an annular groove 76 circumscribing the aperture 56. An annular sealing member 77 is received in the groove 76 and cooperates with the push rod 74. The push rod 74 includes a reduced diameter portion 78 which extends through the chamber 48 and aperture 54 to engage the valve element 60. The housing 38 defines a pair of outlets 80 and 82 opening outwardly from the chamber 48. The outlet 80 communicates with the chamber 26 of flow-control valve 18 via a conduit 84. The other outlet 82 communicates with the atmosphere and defines a flow-restricting orifice 86 therein.

Similarly to the wall 42, the wall 44 defines an elongate annular guide portion 88 circumscribing and in part defining the aperture 58. In order to bias the valve element 60 upwardly in opposition to the spring 62, a stem member 90 is movably received in the guide portion 88 and in chamber 52. The stem member 90 includes a part-spherical head portion 92 which is slidably received in the guide portion 88 of wall 44, a transverse flange portion 94 received in the chamber 52, and an elongate stem part 96 extending between the head 92 and the flange 94. The head portion 92 defines a slight clearance with the guide portion 88 so that chambers 50 and 52 are in fluid communication. An extensible annular bellows member 98 is disposed in the chamber 52. The bellows member 98 is secured at its lower end to the outer perimeter of the flange portion 94 of stem member 90. At its upper end, the bellows member 98 is secured to the housing 38. Consequently, the bellows member 98 divides the chamber 52 into a pair of variable-volume annular cavities 100 and 102. The housing 38 defines a vent opening 104 communicating cavity 100 and chamber 50 with the interior of vent duct 34. A predetermined quantity of a two-phase vapor-liquid medium 106 is disposed in the cavity 102. The two-phase medium 106 has a vapor pressure which is normally greater than atmospheric pressure so that the medium 106 biases the stem member 90 upwardly to engage the head portion 92 thereof with the push rod 74 to move the latter and valve element 60 upwardly in opposition to spring 62 to a normally open position.

During operation of the system 10, pressurized control fluid is received at inlet 70 and flows to the chamber 48 via chamber 46 past the normally open valve element 60. From the chamber 48, the control fluid flows to the atmosphere via flow restricting orifice 86. Because of the flow-restricting orifice 86, a fluid pressure is maintained in chamber 48. The fluid pressure in chamber 48 is communicated to chamber 26 of flow-control valve 18 via conduit 84. Consequently, the valve element 22 of valve 18 is shifted leftwardly to an open position dependent upon the fluid pressure in chamber 48. The fluid pressure in chamber 48 also exerts a downwardly directed force on push rod 74 which is opposed by atmospheric pressure in chamber 50. The push rod 74 is also subject to an upwardly directed force from the stem member 90 which is a function of the effective area of bellows member 98 and the relative vapor pressure of the two-phase medium 106 in cavity 102. As a result a force balance is established on the valve element 60, push rod 74 and stem member 90 which moves the valve element 60 toward engagement with the wall 40. As the valve element 60 moves toward engagement with the wall 40, it throttles the flow of control fluid through aperture 54 so that a pressure is maintained in chamber 48 which is a function of the preload of spring 62, the effective area of push rod 74 exposed to chamber 48, the vapor pressure of medium 106, the effective area of the bellows member 98, and the ambient atmospheric pressure in chamber 50 and cavity 100.

As soon as the valve element 22 of flow-control valve 18 is shifted to an open position a flow of pressurized cooling air C is established in the duct 16. The flow-control valve 18 throttles the pressurized air to substantially atmospheric pressure because the vent duct 34 is large enough that no significant pressurization of the compartment 12 results from the flow of cooling air. As a result, the cooling air flows through compartment 12 from duct 16 to vent duct 34 at atmospheric pressure while absorbing and carrying away heat from the electronic equipment 14. Thus, the cooling air is warmed and flows from the compartment 12 via duct 34 past regulating valve 36.

When the aircraft is at an altitude near sea level, the cooling air in compartment 12 is relatively dense and has a high heat carrying capacity. Therefore, the electronic equipment 14 can be maintained at an acceptable temperature with a rather limited cooling air flow and a relatively high temperature in compartment 12. On the other hand, when the aircraft is at a high altitude, the cooling air in compartment 12 has a low density and low heat carrying capacity and does not carry heat away from the equipment 14 as fast as does cooling air at sea level pressure. Therefore, in order to maintain the equipment 14 at an acceptable temperature, the temperature of the cooling air in compartment 12 must be progressively lowered with increasing aircraft altitude. To this end, a two-phase medium is selected for use in cavity 102 which produces a vapor pressure exceeding ambient pressure both at sea level and at high altitude at temperatures corresponding to acceptable temperatures in the compartment 12 at these respective altitudes. The spring rate and preload of spring 62 is chosen to oppose the vapor pressure of medium 106 and attain a force balance on the valve element 60.

Figure 2:
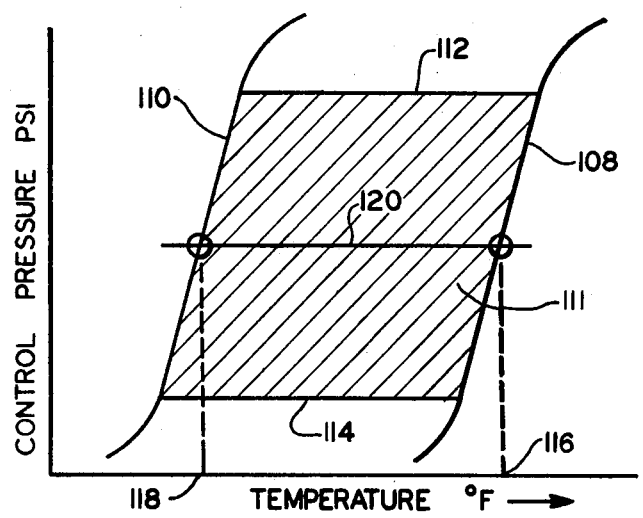
FIG. 2 graphically depicts a control pressure generated by the system illustrated in FIG. 1.

According to a preferred embodiment of the invention, a fluorinated hydrocarbon known under the tradename of Freon 113 is used in cavity 102 of the regulating valve 36. FIG. 2 graphically depicts the control pressure produced by the regulating valve 36 as a function of temperature of the cooling air in vent duct 34 at sea level ambient pressure and at high altitude ambient pressure. Viewing FIG. 2, it will be seen that two of a family of equal-pressure lines 108 and 110 are illustrated. The lines 108 and 110 represent sea level and high altitude ambient pressures, respectively, while their slope is a function of the vapor pressure change with temperature change of the medium 106. Within the shaded region 111 delimited by the lines 112 and 114 the lines 108 and 110 are substantially straight, indicating that the vapor pressure of the two-phase medium 106 varies substantially linearly with temperature. The lines 112 and 114 represent control pressures corresponding to full opening and full closing, respectively, of the flow-control valve 18. Further, the preload of the spring 62 is selected to match the variation in vapor pressure occuring between the selected sea level and high altitude temperatures for the compartment 12, represented by points 116 and 118 on the graph of FIG. 2. Thus, the regulating valve 36 controls the flow-control valve 18 along pressure line 108 at sea level ambient pressure in order to modulate the control pressure to flow-control valve 18 (and the cooling air flow rate) to obtain an air temperature at vent duct 34 nominally equal to that indicated at point 116. Similarly, at high altitude ambient pressure, the valve 36 modulates the control pressure along line 110 to obtain an air temperature nominally equal to that indicated by point 118. At ambient pressures between sea level pressure and high altitude pressure, the regulating valve 36 modulates the control pressure along one of the family of equal-pressure lines within the region 111. According to the preferred embodiment of the invention, the line 120 represents the preferred operating temperature line, with the lines 112 and 114 representing a deviation of about plus and minus 5° F. for maximum and minimum cooling air flow rates, respectively. Thus, the regulating valve 36 will control the temperature of the air in vent duct 34 along line 120 with changing aircraft altitude within an error band having a width of only 10° F.

While the invention has been described with reference to a specifically disclosed preferred embodiment thereof, such reference does not imply a limitation upon the invention. The invention is intended to be limited only by the scope and spirit of the appended claims which alone define the invention.

We claim:

1. The method of carrying heat away from heat-generating apparatus which is disposed within a compartment of an aircraft to thereby limit the operating temperature thereof, said compartment communicating with the atmosphere, said method comprising the steps of:

flowing pressurized cooling air sequentially through a throttling flow-control valve and through said compartment to the atmosphere while maintaining the pressure within said compartment substantially equal to atmospheric pressure;

simultaneously sensing the temperature and pressure within said compartment;

generating a control signal indicative of the heat carrying capacity of said flow of cooling air in response to said sensed temperature and pressure;

using said control signal to modulate said flow-control valve to control the rate of said cooling air flow;

said step of simultaneously sensing the temperature and pressure within said compartment including the steps of:

(a) providing a closed variable-volume chamber having a predetermined quantity of an elastic medium therein, said elastic medium expanding and contracting in response to both temperature and pressure variations;

(b) exposing said variable-volume chamber to the interior of said compartment in simultaneous heat-transfer and pressure-transmitting relation with said cooling air flow so that the volume of said variable-volume chamber is a function of both temperature and pressure within said compartment;

said step of generating a control signal indicative of the heat carrying capacity of said flow of cooling air including the steps of:

(c) flowing pressurized control fluid sequentially through a throttling valve and through a flow-restricting orifice to maintain a fluid pressure control signal therebetween:

(d) modulating said control valve according to the volume of said variable volume chamber so that said control signal fluid pressure is a function of both the temperature and the pressure within said compartment;

said modulating step further including coupling a movable portion of said variable-volume chamber with a valve element of said control valve while sealingly isolating said control signal fluid pressure from said compartment interior.

2. Temperature control apparatus for controlling the flow rate of a gaseous temperature conditioning fluid through an enclosure in response to the relative heat carrying capacity of said fluid, said apparatus comprising:

means for controlling said fluid flow rate in response to a control signal;

means for simultaneously sensing the temperature and pressure of said temperature conditioning fluid, said sensing means including a body substantially defining a single closed variable-volume cavity therein, a predetermined quantity of elastic temperature and pressure responsive medium disposed within said cavity, said body being exposed to the interior of said enclosure in pressure-transmitting relation with said fluid therein, and said body placing said medium in heat-transfer relation with said fluid, said body comprising a bellows member, said body further including an elongate stem member having a flange portion at one end thereof, said bellows member being of elongate annular configuration having open ends, one of said ends of said bellows member sealingly coupling with said flange portion at the perimeter thereof, said bellows member and said flange portion cooperating to bound said cavity;

means responsive to said sensing means for generating said control signal in response to said sensed temperature and pressure, said generating means including a housing defining a flow path therethrough and a valve element movably disposed within said housing, said valve element shifting between a first position engaging said housing to close communication through said flow path and a second position spaced from said housing to open communication through said flow path, and means for drivingly coupling said stem member with said valve element to move the latter between said first and said second positions.

3. The invention of claim 2 wherein said housing defines a pair of guide portions, said stem member defining a part-spherical head portion at the other end thereof, said head portion being slidingly received in one of said guide portions.

4. The invention of claim 3 wherein said coupling means includes a push rod member slidably and sealingly received in the other of said pair of guide portions, said push rod member engaging said part-sperical head portion of said stem member.

5. The invention of claim 4 wherein said housing defines a chamber therein receiving said bellows member, the other end of said bellows member sealingly coupling with said housing and dividing said chamber into said variable-volume cavity and into another cavity, said housing cooperating with said bellows member and with said flange portion to bound said variable-volume cavity, and said housing further defining a vent opening to said other cavity from the interior of said enclosure.

6. The invention of claim 5 wherein said housing defines an additional chamber forming a part of said flow path, and a second vent opening to said additional chamber.

7. The invention of claim 6 wherein said housing defines a flow-restricting orifice in association with said second vent opening.

8. The invention of claim 7 wherein said generating means further includes a resilient element biasing said valve element toward said first position thereof.

9. Temperature control apparatus for controlling the flow rate of a gaseous temperature conditioning fluid through an enclosure in response to the relative heat carrying capacity of said fluid, said apparatus comprising:

means for controlling said fluid flow rate in response to a control signal;

means for simultaneously sensing the temperature and pressure of said temperature conditioning fluid, said sensing means including a body substantially defining a closed variable-volume cavity therein, a predetermined quantity of elastic temperature and pressure responsive medium disposed within said cavity, said body being exposed to the interior of said enclosure in pressure-transmitting relation with said fluid therein, and said body placing said medium in heat-transfer relation with said fluid;

means responsive to said sensing means for generating said control signal in response to said sensed temperature and pressure; and said body comprising a bellows member, said body further including an elongate stem member having a flange portion at one end thereof, said bellows member and said flange portion cooperating to bound said cavity.

10. The invention of claim 9 wherein said bellows member is of elongate annular configuration having open ends, one of said ends of said bellows member sealingly coupling with said flange portion at the perimeter thereof.

* * * * *